United States Patent Office
3,378,505
Patented Apr. 16, 1968

3,378,505
SUBSTITUTED POLYPHENYLENE ETHERS
Allan S. Hay, Schenectady, N.Y., assignor to General Electric Company, a corporation of New York
No Drawing. Filed Nov. 29, 1961, Ser. No. 155,829
19 Claims. (Cl. 260—2.1)

This invention relates to the production of synthetic polymeric compositions and to their use for the removal of anions from liquid media. The invention is concerned more particularly with compositions of matter comprising methyl-substituted polyphenylene ethers having basic groups on the methyl substituents and with their use in removing anions from liquid media, especially aqueous media.

Many natural and synthetic compositions have been proposed for removing ions from solutions. Such materials to be useful must possess the following properties: (1) they must contain either a chemical group which will react with the ion or have an activated surface which physically sorbs the ion; (2) they must be capable of regeneration to at least part of the original activity so that they may be reused; (3) they must be insoluble in the liquid media before and after removing ions from the media. Thus, if the basic form were used as the treating agent it would have to be insoluble both in the basic form and in the salt form, since the basic form is the form before it absorbs anions and the salt form is the form after it absorbs anions.

In my copending application, Ser. No. 212,128, filed July 24, 1962, which is a continuation-in-part of my applications Ser. No. 69,245, filed Nov. 15, 1960 and Ser. No. 744,086, filed June 24, 1958, both of which are now abandoned, I have disclosed and claimed various polyphenylene ethers having the repeating structural unit represented by the formula

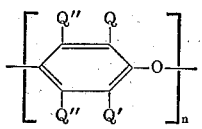

wherein the oxygen atom of one unit is connected to the phenylene nucleus of the adjoining unit, $n$ is a positive integer and is at least 10 and preferably at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q' and Q'' are both monovalent substituents which are the same as Q and in addition, halogen, arylhydrocarbon radicals, haloarylhydrocarbon radicals, hydrocarbonoxy radicals free of an aliphatic, tertiary α-carbon atom, and halohydrocarbonoxy radicals having at least two carbon atoms and being free of an aliphatic, tertiary α-carbon atom. The method comprises reacting oxygen in the presence of a tertiary amine and a cuprous salt soluble in the tertiary amine and capable of existing in the cupric state with a phenol having the structural formula

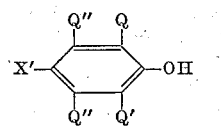

where X' is hydrogen, chlorine, bromine or iodine and Q, Q' and Q'' are the same as defined above. Other specific mixed polyphenylene ethers of this same general type which are useful in the practice of this invention are disclosed and claimed in a copending application of Jack Kwiatek, Ser. No. 744,087, filed June 24, 1958 and assigned to the same assignee as the present invention. Because halomethyl groups are so hydrolytically reactive, they produce undesirable products in the above oxidation reaction if they are substituents on the phenol and are, therefore, excluded from the claims of the above-identified copending applications.

In my copending application Ser. No. 155,287, filed concurrently herewith and assigned to the same assignee as the present invention, I have disclosed and claimed halomethyl-substituted polyphenylene ethers and the method of making the same. These compounds have the repeating structural unit represented by the formula

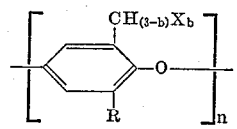

wherein the oxygen atom of one unit is connected to the phenylene nucleus of the adjoining unit, $n$ is a positive integer and is at least 10 and preferably at least 100, $b$ is a number from 0.01 to 3 inclusive, with the proviso that the product obtained by multiplying $m$ by $n$ is at least 1, X is a halogen selected from the group consisting of chlorine and bromine, R is a monovalent substituent selected from the group consisting of hydrogen, halogen, hydrocarbon free of an aliphatic, tertiary α-carbon atom, halohydrocarbon free of an aliphatic, tertiary α-carbon atom, hydrocarbonoxy (i.e., —OR$^a$ where R$^a$ is a monovalent hydrocarbon free of an aliphatic, tertiary α-carbon atom) and halohydrocarbonoxy (i.e., —OR$^a$ where R$^a$ is a monovalent hydrocarbon free of an aliphatic, tertiary α-carbon atom). Preferably $b$ is from 0.1 to 2 inclusive and R is hydrogen, methyl, or halomethyl, for example, —CH$_{(3-b)}$X$_b$ where X and $b$ are the same as defined above.

The overall oxidation reaction for preparing the polyphenylene ethers as disclosed and claimed in my copending application, referred to above, is a reaction involving the hydrogen atom of the phenolic group of one phenol molecule, a hydrogen, chlorine, bromine or iodine substituent in the para position of another phenol molecule and oxygen with the formation of water, according to the following schematic diagram:

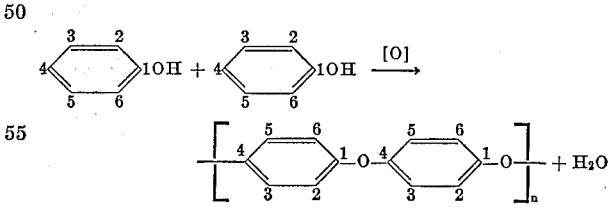

where the numbers indicate the positions of substituents and joining in the names used in this specification, and $n$ is an integer having a value of at least 10.

It is to be understood that the reaction is not a direct oxidation as illustrated but an oxidation involving participation of the copper catalyst system.

The general method of carrying out this oxidation process is to pass an oxygen containing gas through a mixture of one or more monohydric phenols (hereinafter referred to as "phenols") as starting materials, at least one tertiary amine, and at least one cuprous salt.

The phenols which are oxidized by this process to prepare the polyphenylene ethers for use in making the halomethyl compounds of this invention are represented by the following formula:

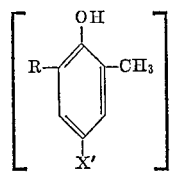

where X′ and R are as defined previously. The polyphenylene ethers so produced may be represented by the formula:

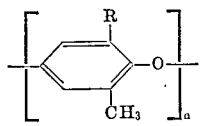

where $n$ and R are as previously defined.

In providing the catalyst comprising a cuprous salt and tertiary amine, the particular cuprous salt used has no effect on the type of product obtained. The only requirement is that the cuprous salt must be capable of existing in the cupric state and must form a complex with the tertiary amine that is soluble in the reaction medium. The necessity for being able to exist in the cupric state is based on my belief that the oxidation of the phenol is accomplished by an intermediate formation of an activated cupric amine complex that reacts with the phenol to regenerate the cuprous amine complex. As far as I can determine, it is impossible to form this activated complex by starting originally with a cupric salt in making the copper amine complex unless reducing conditions are present to form the cuprous salt in situ.

Typical examples of suitable cuprous salts are cuprous chloride, cuprous bromide, cuprous sulfate, cuprous azide, cuprous tetraamine sulfate, cuprous acetate, cuprous propionate, cuprous palmitate, cuprous benzoate, etc. Cuprous chloride, cuprous bromide and cuprous azide produce the highest molecular weight polymers. Although cupric sulfite is not known, cuprous sulfite can be used because it evidently is oxidized to cuprous sulfate. Cuprous salts such as cuprous iodide, cuprous sulfide, cuprous cyanide, cuprous thiocyanate, etc., are not suitable since they are either not soluble in tertiary amines or are not capable of existing as stable cupric salts. For example, cupric cyanide and cupric thiocyanate autogenously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt gave no oxidation of monocyclic phenols in the presence of a tertiary amine. Because of its ready availability and low cost, I prefer to use cuprous chloride.

Examples of tertiary amines which may be used to prepare the catalyst are the aliphatic tertiary amines, such as trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamino-4-pentene, etc. When aliphatic tertiary amines are used, I prefer that at least two of the aliphatic groups be straight chain hydrocarbon groups.

In general, tertiary polyamines would behave in the same way as tertiary monoamines except of course, the amount used would only have to be that amount necessary to give the equivalent amount of amino groups. Typical examples of aliphatic tertiary polyamines are the N,N,N′,N′-tetraalkylethylenediamines, the N,N,N′,N′- tetraalkylpropanediamines, the N,N,N′,N′-tetraalkylbutanediamines, the N,N,N′,N′-tetraalkylpentanediamines, the N,N,N′,N″,N″-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Those tertiary polyamines which have only two or three aliphatic or cycloaliphatic carbon atoms separating the two tertiary amino nitrogens represent a class of polyamines which is superior to the other aliphatic tertiary amines. For example, in the oxidation of monosubstituted phenols and phenol itself, such polyamines give catalysts of enhanced activity and allow the reaction to be run in a shorter time and/or at lower temperature than could be used with the aliphatic tertiary monoamines. However, as in the case of the aliphatic tertiary monoamines, when oxidizing the monosubstituted phenols or phenol itself, the substituents on the amino nitrogen must be large, bulky groups if the high molecular weight polymers are the desired product.

Typical examples of these tertiary polyamines are, for example, N,N,N′,N′ - tetramethylethylenediamine; N-ethyl-N,N′,N′-trimethylethylenediamine; N-methyl-N,N′,N′-triethylethylenediamine; N,N,N′,N′ - tetramethyl-1,3-propanediamine; N,N,N′,N′ - tetraethylethylenediamine; N,N-dimethyl-N′,N′ - diethylethylenediamine; 1,2-bis(2-methylpiperidino)ethane; N,N,N′,N′ - tetra-n-hexylethylenediamine; N,N,N′,N′-tetra-n-amylethylenediamine; 1,2-bispiperidinoethane; N,N,N′,N′ - tetraisobutylethylenediamine; N,N,N′,N′-tetramethyl - 1,3-butanediamine; 1,2-bis(2,6-dimethylpiperidino)ethane; N,N-didecyl-N′,N′-dimethylethylenediamine; N-methyl, N′,N′,N″,N″-tetraethyldiethylenetriamine; N-decyl-N,N′,N′-triethylethylenediamine; 2-(β-piperidinoethyl)pyridine; 2-(β-dimethylaminoethyl)-6-methylpyridine; 2-(β-dimethylaminoethyl)-pyridine; and 2-(β-morpholinoethyl)pyridine; etc.

Examples of cyclic amines are the pyridines, such as pyridine itself, quinuclidine, the dipyridyls, the N-alkyl pyrroles, the N-alkyl pyrrolidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substitutents, is also attached to the amine nitrogen group, i.e., N-methyl pyrrole, N-methyl tetrahydroquinoline, N-methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

Many factors affect the stability of the complex of the tertiary amine and the cuprous salt. These factors are well known in the art and are discussed in detail in such texts as "The Chemistry of the Coordination Compounds" edited by John C. Bailar, Jr., Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex as indicated by the basicity of the tertiary amines I use as ligand also is an indication of the activity of the catalyst. Those tertiary amines which are strong bases form more active catalysts than tertiary amines which are weak bases. When the latter are used, typical examples of which are 3,5-diphenylpyridine, phenanthridine, etc., I find that heating of the reaction mixture is desirable to cause the oxidation reaction to proceed rapidly.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects, I prefer not to use tertiary amines having an N-aryl substituent.

The preferred group of phenols for preparing the polyphenylene ether starting materials are o-cresol, the 2-halo-6-methylphenols, e.g., 2-chloro-6-methylphenol, 2-bromo-6-methylphenol, etc., and 2,6-xylenol. However, other phenols having hydrocarbon, halohydrocarbon, hydrocarbonoxy or halohydrocarbonoxy groups in one ortho position and a methyl group in the second ortho position may also be used, including those also having an aryloxy substituent in the para position. Examples of such phenols are: 2-ethyl-6-methylphenol, 2-propyl-6-methylphenol, the 2-butyl-6-methylphenols, the 2-pentyl-6-methylphenols, 2-cyclohexyl-6-methylphenol, 2-phenyl-6-methylphenol, 2-tolyl-6-methylphenol, 2-benzyl-6-methylphenol, 2-methoxy-6-methylphenol, 2-ethoxy-6-methylphenol, 2-phenoxy-6-methylphenol, the 2-(chloroethyl)-6-methylphenols, the 2-(chlorophenyl)-6-methylphenols, the 2-(bromopropoxy)-6-methylphenols, the 2-(iodophenoxy)-6-methylphenols, the 2-(difluoroethyl)-6-methylphenols, 2,6-dimethyl-4-(2',6'-dimethylphenoxy)phenol, 2,6-dimethyl-4-(2'-methylphenoxy)phenol, etc.

The preference of the oxidation reaction to involve the para position of these phenols is so pronounced that if it is substituted with chlorine, bromine or iodine and the two ortho positions have substituents other than hydrogen, the halogen will be removed from the para position even though the meta positions are unsubstituted. In such case, the halogen atom reacts with and inactivates one molecule of copper catalyst. Therefore, it is necessary to use 1 mole of catalyst for each atom of halogen removed. Since the reaction involving hydrogen atoms in the para position does not destroy the catalyst, only a small catalytic amount needs to be used of the order of 0.1 to 10 mole percent, based on the moles of phenol to be oxidized. Therefore, I prefer to use phenols in my oxidation process which have hydrogen in the para position.

In preparing the catalyst system, mixtures of tertiary amines and mixtures of cuprous salts may be used, but no benefit would accrue from such use over the catalyst prepared by using only a single tertiary amine and a single cuprous salt. Preferably, the cuprous salt is dissolved in the tertiary amine before the phenol reactant is added. In some cases, the dissolving of the cuprous salt may be hastened by heating the mixture, by bubbling in air or oxygen, or a combination thereof. In order to effectively use all of the copper, enough amine should be added to complex and thereby dissolve all of the added cuprous salt. Larger excesses of amine do not adversely affect the reaction, and in some cases may be desirable in order to completely dissolve all the phenol reactant and to act as a solvent for the reaction product. Other solvents such as alcohols, ketones, hydrocarbons, chlorohydrocarbons, nitrohydrocarbons, ethers, esters, amides, mixed ether esters, sulfoxides, etc., may be present in the reaction system, providing they do not interfere or enter into the oxidation reaction. Oxygen or oxygen containing gas is bubbled into the reaction mixture causing an exothermic reaction to take place with the formation of water as a by-product. Since polymeric phenylene ethers are the desired product, it is preferable to prevent the escape of this water of reaction from the reaction vessel when carrying out the reaction by batch process, or to control the escape of water so that there is always one mole of water present for each mole of copper catalyst when carrying out the reaction by batch or continuous process. This can be done by carrying out the reaction under reflux conditions, in a closed reaction system, at superatmospheric pressure, by cooling, in the presence of desiccants, or any combination thereof with controlled removal of water, if desired. Desiccants are especially useful for removing excess water where the water forms faster than it can evaporate and it forms a separate phase with the reaction medium.

The oxygen can be diluted with an inert gas such as nitrogen, helium, argon, etc., or air can be used.

Since the reaction is usually exothermic, the reaction can become overheated, resulting in the formation of undesirable products, since the resins tend to cross-link and form gels. Generally, I initiate the oxidation reaction at as low a temperature as the reaction will start, as evidenced by the reaction becoming exothermic. Usually, I control the oxidation reaction so that the maximum temperature does not exceed 100° C. and preferably does not exceed 80° C. The heat of reaction may be removed, for example, by radiation, convection, or by cooling coils which can either be immersed in, or surround the reaction vessel.

Ordinarily, the passage of oxygen into the reaction mixture is continued until no more heat is generated, or the desired amount of oxygen is absorbed. Alternatively, I may intermittently or continuously add the same or a different phenol than the starting material during the oxidation reaction to produce a mixed polyarylene ether which has a different structure than if the mixed phenols were used as starting materials. To terminate the reaction, I destroy the catalyst system by addition of an acid preferably a mineral acid, such as hydrochloric acid or sulfuric acid, which reacts with the tertiary amine and cuprous salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which inactivates the copper. After the product is precipitated, it may be redissolved and reprecipitated any desirable number of times to remove impurities. Further details concerning the preparation of the polyphenylene ethers may be found in the copending Hay and Kwiatek applications, referred to above.

In preparing the halomethyl derivatives of these polyphenylene ethers, the corresponding methyl-substituted polyphenylene ether is dissolved in a suitable solvent, preferably one which will be inert to the halogenating agent, such as a halogenated hydrocarbon, and thereafter reacted with a brominating or chlorinating agent which may be the free elemental halogen, e.g., chlorine or bromine, or a halogenating agent, for example, sulfuryl chloride, sulfuryl bromide, bromosuccinimide, etc. The reaction may be carried out at atmospheric, subatmospheric or superatmospheric pressure, at, below or above ambient temperature. Generally, I prefer to use atmospheric pressure and the temperature from ambient up to that obtained by refluxing the reaction mixture. The halogenation reaction may be hastened by means of exposure of the solution to actinic radiation, e.g., light from an ultraviolet lamp. If a liquid halogenation agent is being used, enough is added to give the desired mono-, di-, or tri-halosubstituted methyl groups on the polymer.

If a gaseous halogenation agent is used, enough is passed into the reaction mixture until the amount absorbed is sufficient to give the desired degree of halogenation of the methyl groups. In general, the preponderance of the methyl groups will be monohalogenated before a second halogen is introduced and dihalogenated before a third halogen is introduced into a significant number of the methyl groups.

The halogenated polymer is recovered by pouring the solution into a large volume of a liquid which will precipitate the polymer but will dissolve the balance of the reaction mixture. A convenient solvent for this is methanol. The product may be dissolved and reprecipitated as many times as desired to obtain the desired degree of purification.

The method of preparing these halomethyl-substituted polyphenylene oxides is more fully described and specifically claimed in my copending application Ser. No. 155,287 referred to above.

By preparing derivatives of the polyphenylene ethers having basic groups, I am able to convert the polyphenylene ethers into compounds capable of forming salts with anions and therefore useful as ion exchange resins which can be used for removing anions from liquid media, or as ion exchange resin membranes which are selectively permeable to anions.

The halomethyl groups on the polyphenylene ethers are very reactive and will readily react with ammonia, amines, organic sulfides and tertiary phosphines whereby the halogen group is replaced by the corresponding amino, quaternary ammonium, ternary sulfonium or quaternary phosphonium group, hereinafter referred to as basic group. In the case of ammonia, primary amines and secondary amines, the amino group is formed as the hydrohalide salt and in the case of tertiary amines, organic sulfides and tertiary phosphines, is formed as the corersponding quaternary ammonium halide, ternary sulfonium halide or quaternary phosphonium halide. In any case, the corresponding amino, quaternary ammonium hydroxide, ternary sulfonium hydroxide or quaternary phosphonium hydroxide, is formed by treatment with a base stronger than the basic groups of my anion exchange resins, e.g., alkali metal hydroxides, etc., preferably in aqueous solutions. For preparing the anion exchange resins of this invention, the mono(monohalomethyl)- and bis(monohalomethyl)-substituted polyphenylene ethers can be reacted with one or more or a mixture of various organic sulfides, bissulfides, tertiary phosphines, bisphosphines, amines, i.e., primary, secondary, and tertiary amines including mono amines and polyamines, as well as ammonia, etc. Examples of suitable tertiary amines have already been given in the discussion of the catalyst for preparation of the polyphenylene ethers. In addition to these amines, tertiary amines containing alkanol substituents, e.g., N-$\beta$-hydroxyethyl-N,N-dimethylamine, N-$\beta$-hydroxypropyl-N,N-diethylamine, etc,. may be used as well as the primary and secondary amines corresponding to all these tertiary amines whereby one or two of the hydrocarbon groups are replaced by hydrogen, e.g., methylamine, dimethylamine, ethylenediamine, diethylenetriamine, N-$\beta$-hydroxyethylmethylamine, etc. Preferably, the amine is a tertiary aliphatic amine including those tertiary amines which have from one to three hydroxy aliphatic groups as the aliphatic substituent on the amine nitrogen.

Examples of organic sulfides are the hydrocarbon sulfides corresponding to the formula $(R'')_2S$ or $R''S-R'''-SR''$ where each $R''$ is the same or different monovalent hydrocarbon radical, e.g., aliphatic, including cycloaliphatic and aryl substituted aliphatic (for example, methyl, ethyl, vinyl, propyl, allyl, metallyl, butyl crotyl, octyl, dodecyl, benzyl, phenylethyl, cyclohexyl, cyclohexenyl, cyclopentyl, etc., and isomers and homologues thereof), aryl (for example, phenyl, naphthyl, tolyl, ethyl phenyl, etc., and isomers and homologues thereof), and $R'''$ is a divalent hydrocarbon radical, examples of which are 1,2-ethylene, 1,2-propylene, 1,3-propylene, 1,4-phenylene, 1,4-naphthalene, etc.

Examples of tertiary phosphines are those corresponding to the formula $(R'')_3P$ or $(R'')_2P-R'''-P(R'')_2$ where $R''$ and $R'''$ are as defined above.

Specific examples of sulfides and phosphines are dimethyl sulfide, diethyl sulfide, triethyl phosphine, methylethyl sulfide, tributylphosphine, diallyl sulfide, dibenzyl sulfide, triphenyl phosphine, 1,4-bis(methylthio)-butane, 1,4-bis(dibutyl phosphine)benzene, etc.

These reactions for amines and phosphines may be represented by the following equation:

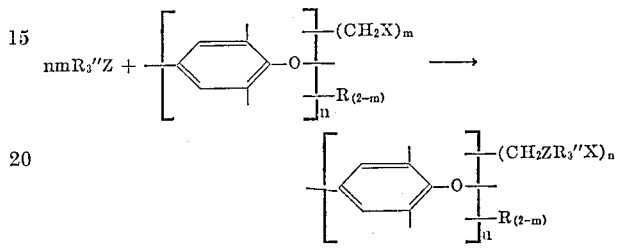

where Z is nitrogen or phosphorous and $n$, R and $R''$ are as previously defined with the addition that $R''$ may also be hydrogen when Z is nitrogen and $m$ is a number from 0.01 to 2 inclusive. The reaction for sulfides is the same except that the subscript for $R''$ is 2 instead of 3 and Z is sulfur.

The free base is obtained when the compounds represented by the above formula are treated with a base having a higher dissociation constant than the basic groups of the anion exchange resin under ionizing conditions, for example, in aqueous solution. In the case of those compounds having amino groups wherein at least one $R''$ is hydrogen, they are converted to polymers containing free amino groups according to the following equation:

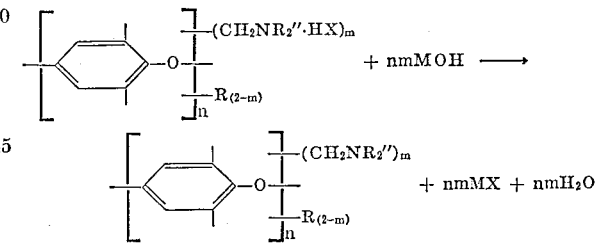

I all three $R'''$'s are hydrocarbon or hydroxy aliphatic, the reaction is represented by the following equation:

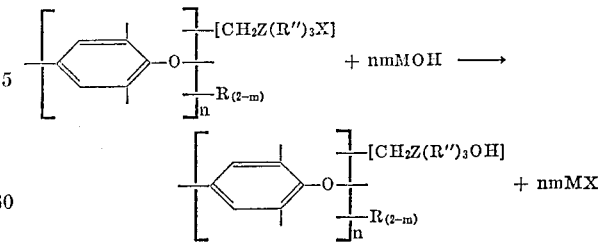

where in both equations $n$, $m$, R, X, Z and $R''$ have the same meanings as defined previously and M is a cation of a strong base which may be, for example, an alkali metal, examples of which are lithium, sodium, potassium, rubidium, cesium, etc. Again, when Z is sulfur the subscript for $R''$ is 2 instead of 3.

When the halomethyl groups are reacted with a polyamine, bissulfide or bisphosphine, cross-links are produced between two or more polyphenylene ether chains, since these compounds have several groups, each of which can react with a halomethyl group. The production of these cross-links is a highly desirable property in many cases, and especially where it is desired to decrease the solubility of the anion exchange resins of this invention in various solvents. As will be readily apparent to those skilled in the art, I may use a monoamine, monosulfide or monophosphine to convert most of the halomethyl groups to basic groups and use only a small amount of a polyamine, bissulfide or bisphosphine to effectively cross-link the polymer, or I may use various proportions from 100 percent of the mono-compounds to 100 percent of the poly-compounds to obtain various degrees of cross-linking or solubility in the polymers to fit particular applications. Mixtures of amines, sulfides and phosphines can also be used.

From the above discussion it is apparent that the resinous compositions of this invention which have anion exchange properties have repeating units which may be represented by the formula:

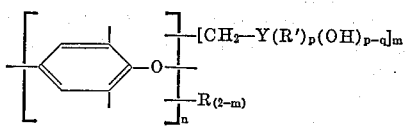

where the oxygen of one unit is attached directly to the para position of the phenylene nucleus of the adjacent unit, Y' is selected from the group consisting of nitrogen, sulfur and phosphorous, each R' is the same or different hydrocarbon and may be monovalent or polyvalent when joined to more than one Y group and, in addition, may be hydroxy aliphatic when Y is nitrogen, and hydrogen when Y is nitrogen and $p$ is 2, $n$ is a positive integer and is at least 10 and preferably 100, $m$ is a number from 0.01 to 2 inclusive, with the proviso that the product obtained by multiplying $m$ by $n$ is at least 1, $p$ is an integer from 2 to 3 inclusive and $q$ is 2 when Y is nitrogen, and $p$ is 2 and $q$ is one when Y is sulfur, and $p$ is 3 and $q$ is 2 when Y is phosphorous, and R is a monovalent substituent selected from the group consisting of hydrogen, halogen, hydrocarbon free of an aliphatic, teritiary α-carbon atom halohydrocarbon free of an aliphatic, tertiary α-carbon atom and —OR$^a$ where R$^a$ is a monovalent substituent selected from the group consisting of hydrocarbon free of an aliphatic, tertiary α-carbon atom and halohydrocarbon free of an aliphatic, tertiary α-carbon atom.

Where a liquid medium having various anion impurities dissolved therein is brought in contact with the compositions of my invention, the anions, for example, chloride ions, nitrate ions, phosphate ions, sulfate ions, carbonate ions, bicarbonate ions, etc., react with the basic groups to form salts as a part of the resin molecule. The anions are therefore effectively removed from solution. After the resin has sorbed the anion, it can readily be regenerated, for example by washing with a strong base, preferably an alkali metal hydroxide in aqueous solution to form soluble salts with the sorbed anions.

Depending upon the number of basic groups per polymer repeating unit and the particular liquid medium, the resins range from soluble to insoluble materials. Solutions of the ion exchange resins may be used to prepare solid film membrane useful in non-solvent liquids or the solutions may be used to produce static free or semiconductor surfaces on objects or as an immiscible phase in removing ions from the other phase in which the polymer is essentially not soluble or at least only slightly soluble.

For maximum ion exchange capacity, I desire to introduce one basic group on each methyl group of each aryl nucleus of the polymer molecule (i.e., $m$ is one in the formula of the compositions of this invention). However, solubility of the polymer in water is related to the number of basic groups per aryl nucleus. Therefore, in many applications, where insolubility in water is desired, there may be as little as one basic group on one out of every 100 aryl nuclei (i.e., $m$ is 0.01) and yet still be a satisfactory anion exchange resin. Preferably, $m$ in the formula for the compounds of this invention is in the range of 0.1 to 2.

I may also decrease solubility in various solvents by cross-linking the polymer, as discussed previously to enable a higher proportion of basic groups to be used without making the polymer soluble.

In order that those skilled in the art may better understand my invention, the following examples are given which are illustrative of the practice of my invention and are not intended for purposes of limitation. In the examples, all parts are by weight unless stated otherwise.

Example 1

This example illustrates the preparation of poly(2,6-dimethyl-1,4-phenylene ether). Oxygen was continuously bubbled through a vigorously stirred solution of 900 ml. of nitrobenzene, 150 ml. of pyridine, 6 grams of cuprous chloride and 1 gram of picric acid during the entire reaction period. When all of the copper salt had dissolved, 50 grams of 2,6-dimethylphenol were added. During 15 minutes the temperature of the reaction mixture rose from 30° C. to 40° C., after the temperature declined so that at the end of an additional 15 minutes the temperature was 36° C., and the solution was very viscous. The reaction mixture was diluted with an equivalent volume of toluene, followed by the addition of methanol which caused the polymer to precipitate. The polymer was separated by filtration, dissolved in chloroform, filtered and reprecipitated with methanol containing a small amount of hydrochloric acid to remove traces of the amine. The polymer was filtered from the solution and dried in vacuo at 130° C. The yield was 40 grams (81% of theory) of poly(2,6-dimethyl-1,4-phenylene ether) having an intrinsic viscosity of 1.09. This polymer may be represented by the formula:

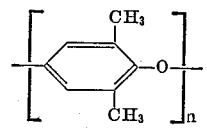

where $n$ is at least 10.

Example 2

This example illustrates the preparation of poly(2-methyl-1,4-phenylene ether). Oxygen was continuously passed through a vigorously stirred solution of 135 ml. of s-tetrachloroethane, 1 gram of cuprous chloride, 3 grams of 2-n-amylpyridine and 4.2 grams of anhydrous magnesium sulfate during the entire reaction period. When the cuprous salt had dissolved, 7.5 grams of o-cresol were added. During a reaction time of 50 minutes, the temperature rose from 30° C. to a maximum of 47° C. The reaction was continued for an additional 50 minutes, after which time the polymer was precipitated by pouring the reaction mixture into methanol containing sufficient hydrochloric acid to react with the amine. The solid was separated by filtration and dissolved in chloroform. The solution was filtered and the polymer reprecipitated by pouring into methanol. After drying there was obtained 6.4 grams (86% of theory) of poly(2-methyl-1,4-phenylene ether) having an intrinsic viscosity of 0.21. This polymer may be represented by the formula:

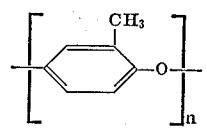

where $n$ is at least 10.

Example 3

Bromine was gradually added to a solution of poly(2,6-dimethylphenylene ether) in refluxing sym-tetrachloroethane in the proportions of slightly more than 2 moles of bromine per mole of ether and reacted until the color of the bromine disappeared (ca. 70 minutes), care being taken to prevent loss of bromine from the reaction vessel. The brominated polymer was isolated by pouring the reaction mixture into methanol and filtering it from solution. The product may be purified by redissolving in chloroform, filtering and reprecipitating by pouring into methanol. On analysis, the product was found to contain 57.6% bromine which corresponds to 2.0 bromine atoms per polymer unit, or 1 bromine atom on each of the two methyl groups. It was previously demonstrated that bromination of this polymer introduces bromine into the methyl groups rather than to the aryl nucleus since essentially all of the bromine can be removed by reaction with lithium aluminum hydride. The removal of bromine by this reagent is specific to benzylic halides and is incapable of removing halogen from the aryl nucleus. This polymer corresponds to the formula:

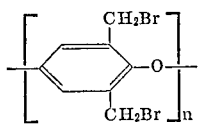

where $n$ is at least 10.

Example 4

A solution of 3 grams of a brominated polymer similar to that prepared in Example 3 but containing 1.89 bromine atoms per polymer unit (i.e., the polymer contains both

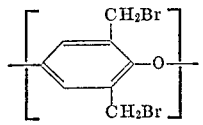

and

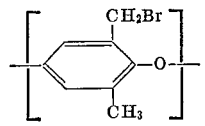

units) was dissolved in 150 ml. of benzene with vigorous stirring. Trimethyl amine was bubbled through the solution for a period of 10 minutes causing a precipitate to form in the reaction mixture. The solid was filtered off, washed and dried in vacuo to yield 3.0 grams of a colorless solid. This polymer had an analysis of 36.1% carbon, 5.5% hydrogen, 6.7% nitrogen, and 43.7% bromine. The ratio of nitrogen to bromine in the polymer is 0.89 indicating that 89% of the bromine had reacted with the amine to produce a quaternized ammonium salt. On treating with a strong base such as sodium hydroxide, the quaternary ammonium bromide salt is converted to a quaternary ammonium hydroxide which is capable of removing anion from solution. This polymer contains

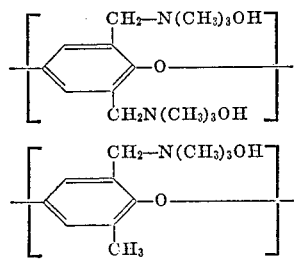

and

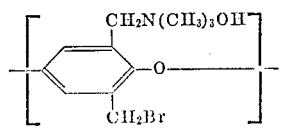

units.

Example 5

Example 4 was repeated but using 5 grams of N,N,N',N'-tetramethylethylenediamine in place of the trimethyl amine. A solid precipitate immediately formed but the reaction mixture was stirred for a total of 4 hours. On filtering the solid from solution, washing and drying in vacuo, 4.2 grams of an almost colorless solid which analyzed as containing 46.2% carbon, 6.5% hydrogen, 33.9% bromine, and 6.1% nitrogen, was obtained. The diamine had formed cross-links between the polymer chains since the polymer was no longer soluble in solvents, and would not even swell appreciably in boiling water, thus indicating a very high degree of cross-linking. Treating this polymer with a strong base such as sodium hydroxide again converts the quaternary ammonium bromide groups to quaternary ammonium hydroxide groups capable of removing anions from solution. This polymer contains a variety of units similar to Example 4 and in addition contains bridging units between chains which correspond to the formula:

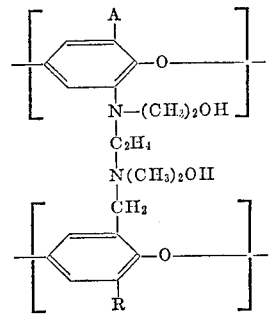

where the two positions marked A may be methyl, bromomethyl,

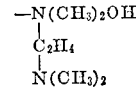

or additional cross-links.

Example 6

When Example 5 was repeated except using a cast film which was immersed in a methanol solution containing the N,N,N',N' - tetramethylethylenediamine and refluxed for 2 hours, no visual change was observed. However, it was found that the polymer film had a bulk analysis of 35% carbon, 2.4% hydrogen, 50.5% bromine and 2.2% nitrogen. The high bromine-to-nitrogen ratio of 11.1 indicates a very low degree of quaternization. However, it was found that the surface of the film was unaffected by solvent which would ordinarily dissolve the unreacted film, but that the inner layer could be dissolved out, leaving the two surface films of the quaternized skin. This example illustrates that a membrane may be made in which the anion exchange groups are only on the surface. This type of reaction is especially adaptable for making anion exchange resins on surfaces of inert fillers or for making surfaces free of static charges. The cross-linked polymer units on the surface correspond to those of Example 5.

Example 7

A polymer similar to that prepared in Example 3 but containing 2.04 bromine atoms per polymer unit was cast into a film on a glass plate from a solution in sym-tetrachloroethane. The films were cut into pieces 1 inch x 3 inches, approximately 9 mils thick. Three samples of this film were placed in stoppered flasks containing 150 ml. of methanol and each film was treated with a different amine, as follows: film A with 1 gram of N,N,N',N'-tetramethylethylenediamine and 2.4 grams of trimethyl amine; film B was treated with 1.07 grams of tetramethylenediamine and 1.66 grams of trimethyl amine; film C was treated with 1.32 grams of N,N,N',N'-tetramethylethylenediamine and 1.33 grams of trimethyl amine. After treating for 72 hours the films were measured. Film A measured 2 x 6 inches, film B 1¾ x 5 inches, and film C 1½ x 4½ inches. As can be seen, the amount of swelling decreases as the concentration of the diamine increases. Each of the films was soaked in 50% sodium hydroxide solution to convert the quaternary ammonium bromide groups to quaternary ammonium hydroxide groups. After 2 hours, the films were washed with distilled water until the supernatant liquid was neutral. The films were treated with an excess of 0.5 N hydrochloric acid solution and then back titrated to the phenolphthalein end point with 1 N sodium hydroxide solution. It was found that the films had the following ion exchange capacities in milliequivalents per gram of polymer: film A—2.3; film B—2.7; film C—2.1. This example illustrates that by the judicious choice of a monoamine and a polyamine, any desired degree of cross-linking may be readily obtained with no marked effect on the ion exchange capacity of the resin obtained. The polymer of this example would have units corresponding to both those of Examples 4 and 5.

Example 8

A solution of 1 gram of the brominated polymer used in Example 7 in 10 ml. of tetrahydrofuran was cooled by immersion in a Dry Ice acetone bath. To this solution was added 2 grams of N,N,N′,N′-tetramethylethylenediamine and 1 gram of N,N-dimethylaminoethanol. After the solution was thoroughly mixed, there was no evidence of any reaction occurring. The solution was poured into a flat dish as a thin layer. The solution became opaque as the solution was allowed to gradually warm to room temperature and finally solidified by the time it had reached room temperature, and could be removed as a flexible membrane. The membrane was treated with 50% aqueous sodium hydroxide solution for 3 hours washed thoroughly with distilled water until neutral. The membrane was treated with an excess of 0.1 N hydrochloric acid which was then back titrated with 0.1 N sodium hydroxide solution. This polymer had an anion exchange capacity of 3.8 meq./gram of resin. This polymer in addition to having the same units as Example 5, would also have units corresponding to the formula

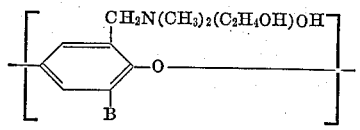

where B is methyl, bromoethyl, as a substituent corresponding to the two amines added.

Example 9

A solution of 10 grams of borminated polymer similar to that prepared in Example 3 but containing 1.1 bromine atoms per polymer unit was dissolved in 200 ml. of methylene chloride. To this solution was added 100 ml. of water and 4 grams of dimethyl sulfide. The reaction mixture was heated at reflux for a period of 3 hours. 75 ml. of the 10% aqueous sodium hydroxide solution was added and the reaction mixture agitated for 1 hour, after which it was poured into 500 ml. of methyl alcohol causing a tan precipitate to form. The precipitate was filtered and washed repeatedly with water until free of sodium hydroxide. A weighed sample of the dried product was treated with a given volume of standard acid which was then back titrated to determine the excess. This resin had an anion exchange capacity of 0.42 meq./gram of resin. The active anion exchange group introduced in the polymer by this reaction was

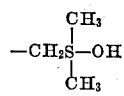

In a manner similar to that in Example 9, a trialkyl phosphine for example, tri-n-butyl phosphine, may be substituted in an equivalent amount for the dimethyl sulfide, care being taken to handle this material and carry out the reaction in the absence of oxygen. The reactive anion exchange group introduced in the polymer by this reaction is

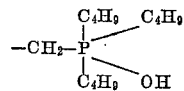

Example 10

In a manner similar to that in Example 3, poly(2,6-dimethylphenylene ether) was chlorinated by using chlorine in place of bromine. Chlorine analysis showed that there was 0.73 atom of chlorine for each polymer unit. A concentrated solution of 5 grams of the chloromethylphenylene ether in tetrahydrofuran and a concentrated solution of 1.2 grams of N,N,N′,N′-tetramethyl-1,3-butanediamine in tetrahydrofuran were quickly blended to form a homogeneous solution and poured onto a flat glass plate to form a film before gelation commenced. After drying overnight at 80° C. to evaporate the tetrahydrofuran, the resin was stripped from the plate as a very tough, cross-linked film. The quaternary ammonium chloride groups of the polymer were converted to quaternary ammonium hydroxide groups by soaking the film in aqueous sodium hydroxide solution, rinsed thoroughly with water and dried. A portion of the dry film weighing 0.0908 gram was suspended in 10 ml. of 0.1300 N hydrochloric acid until equilibrium was established. On removal of the film, the excess acid was back titrated potentiometrically with 0.1165 N sodium hydroxide solution. The amount of base required was 9.00 ml. showing that this film had an ion exchange capacity of 2.77 meq./g.

By this technique, it is possible to form any desired shaped object or to coat or impregnate other objects with a coating of my ion-exchange resins which become cross-linked, i.e., insoluble and infusible, when the resin gels and hardens.

Example 11

A solution of chlorinated poly(2,6-dimethylphenylene ether) and N,N,N′,N′-tetramethyl-1,3-butanediamine in tetrahydrofuran was mixed as described in Example 10. The solution was poured over a platinum screen having a wire electrode to fill the interstices. A piece of filter paper was pressed on top of the platinum screen and thoroughly saturated with the solution and a second platinum screen was placed on top of the filter paper and pressed into the solution to fill the interstices. After drying and gelation of the resin and treating with aqueous sodium hydroxide and washing with water as described in Example 10, the film was clamped between the openings of two cup-shaped plastic housings, each equipped with a gas inlet and outlet to form a fuel cell. Hydrogen gas was admitted to one of the chambers, while air was left in the other chamber. A potential of 0.6 v. was measured between the two platinum screens. When the hydrogen was replaced with air, the voltage dropped to 0, but when hydrogen was again admitted into the chamber, the potential returned to 0.6 volt, showing that the assembly was operating as a fuel cell in which the hydrogen in the one chamber was being oxidized by the air in the other chamber with the release of electrical energy.

In preparing my resins, I may include an inert material such as diatomaceous earth (e.g., fuller's earth including spent fuller's earth from petroleum refining processes), alumdum, coke, silica, cinders, porous glass, etc., as a cation for the polymer to increase the effective surface of the latter. This may be done by adding such fillers to a solution of either the starting polymer, a halogenated polymer or the polymer after producing an ion exchange resin. Other fillers, dyes, pigments, etc., may likewise be added if desired.

The compositions of this invention may be fabricated into sheets, films, or may be prepared as granulated polymers and may be used in all those applications where ion exchange resins are useful. For example, they may be used for water treating, as the solid electrolyte in fuel cells, for removal of ions from solution, in electrodialysis for the purification of liquids or solutions, etc.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A composition comprising a polyphenylene ether having the structural formula

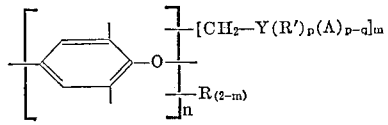

where Y is selected from the group consisting of nitrogen, sulfur and phosphorus, each R' is a substituent selected from the group consisting of polyvalent hydrocarbon when joined to more than one Y group and monovalent hydrocarbon when joined to only one Y group and, in addition, hydroxyaliphatic and hydrogen when Y is nitrogen, $n$ is a positive integer and is at least 10, $m$ is a number from 0.01 to 2 inclusive, with the proviso that the product obtained by multiplying $m$ by $n$ is at least 1, $p$ is an integer from 2 to 3 inclusive and $q$ is an integer from 1 to 2 inclusive with the provisos that $q$ is 2 when Y is nitrogen, $p$ is 3 and $q$ is 2 when Y is phosphorus, and $p$ is 2 and $q$ is one when Y is sulfur, A is a substituent selected from the group consisting of chlorine, bromine and hydroxyl with the proviso that when A is hydroxyl and Y is nitrogen, the nitrogen is free of directly bonded hydrogen substituents and $p$ is 3, and R is a monovalent substituent selected from the group consisting of hydrogen, halogen, hydrocarbon, free of an aliphatic, tertiary α-carbon atom, halohydrocarbon free of an aliphatic, tertiary α-carbon atom and —OR$^a$ where R$^a$ is a monovalent substituent selected from the group consisting of hydrocarbon free of an aliphatic, tertiary α-carbon atom and halohydrocarbon free of an aliphatic, tertiary α-carbon atom.

2. A polyhaloxylenol of the formula

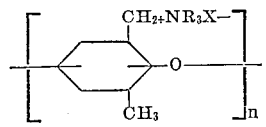

R being an alkyl group and $n$ being an integer and is at least 10, and X being a halogen selected from the group consisting of chlorine and bromine, wherein the proportion of substituent groups of said polyhaloxylenol is between 1–4 —CH$_2$+NR$_3$X— groups for 6 of the

—CH$_2$+NR$_3$X— groups plus —CH$_3$ groups in said polyhaloxylenol.

3. The polyhaloxylenol of claim 2, X being bromine.

4. A composition comprising a polyphenylene ether having the structural formula

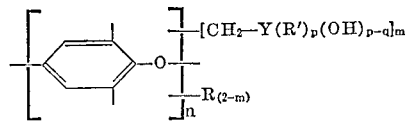

where Y is selected from the group consisting of nitrogen, sulfur and phosphorus, each R' is a substituent selected from the group consisting of polyvalent hydrocarbon when joined to more than one Y group and monovalent hydrocarbon when joined to only one Y group and, in addition, hydroxyaliphatic when Y is nitrogen and hydrogen when Y is nitrogen and $p$ and $q$ are each 2, $n$ is a positive integer and is at least 10, $m$ is a number from 0.01 to 2 inclusive, with the proviso that the product obtained by multiplying $m$ by $n$ is at least 1, $p$ is an integer from 2 to 3 inclusive and $q$ is an integer from 1 to 2 inclusive with the proviso that $p$ is 3 and $q$ is 2 when Y is nitrogen and phosphorus and $p$ is 2 and $q$ is one when Y is sulfur, and R is a monovalent substituent selected from the group consisting of hydrogen, halogen, hydrocarbon free of an aliphatic, tertiary α-carbon atom, halohydrocarbon free of an aliphatic, tertiary α-carbon atom and —OR$^a$ where R$^a$ is a monovalent substituent selected from the group consisting of hydrocarbon free of an aliphatic, tertiary α-carbon atom and halohydrocarbon free of an aliphatic, tertiary α-carbon atom.

5. The compositions of claim 4 wherein Y is nitrogen, R' is hydrocarbon and R is halohydrocarbon free of an aliphatic, tertiary α-carbon atom.

6. The compositions of claim 5 wherein the polymer has been cross-linked by reaction with a polyamine.

7. The compositions of claim 4 where Y is nitrogen, R is hydrocarbon free of an aliphatic, tertiary α-carbon atom and R' is hydrocarbon.

8. The compositions of claim 4 wherein Y is sulfur, R' is hydrocarbon, and R is halohydrocarbon free of an aliphatic, tertiary α-carbon atom.

9. The compositions of claim 4 wherein Y is sulfur, R is hydrocarbon free of an aliphatic, tertiary α-carbon atom and R' is hydrocarbon.

10. A composition comprising a polyphenylene ether containing both units having the formula:

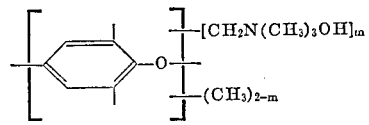

and units having the formula:

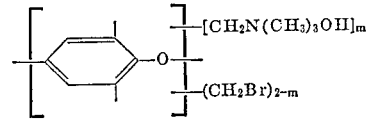

where $m$ is an integer from 1 to 2 inclusive in both formulas, said polyphenylene ether having at least 10 phenylene ether units in the polymer molecule.

11. The composition of claim 10 wherein the polyphenylene ether has been cross-linked by reacting it with a polyamine.

12. The composition of claim 7 wherein the polyphenylene ether has been cross-linked by reacting it with N,N,N',N'-tetramethylethylenediamine.

13. A composition comprising a polyphenylene ether containing both units having the formula:

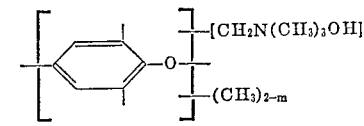

and units having the formula

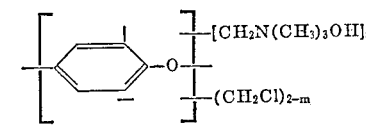

where $m$ is an integer from 1 to 2 inclusive in both formulas, said polyphenylene ether having at least 10 phenylene ether units in the polymer molecule.

14. The composition of claim 13 wherein the polyphenylene ether has been cross-linked by reacting it with a polyamine.

15. The composition of claim 13 wherein the polyphenylene ether has been cross-linked by reacting it with N,N,N',N'-tetramethyl-1,3-butanediamine.

16. An ion exchange resin comprising the polyphenylene ether of claim 4.

17. An ion exchange resin comprising the polyphenylene ether of claim 7.
18. An ion exchange resin comprising the polyphenylene ether of claim 9.
19. An ion exchange resin comprising the polyphenylene ether of claim 10.

References Cited
UNITED STATES PATENTS

| | | | |
|---|---|---|---|
| 2,591,574 | 4/1952 | McBurney | 260—2.1 |
| 2,632,001 | 3/1953 | McMaster et al. | 260—2.1 |
| 3,134,753 | 5/1964 | Kuratek | 260—47 |

OTHER REFERENCES

Haynes et al., Chemical Society Journal, pp. 2823–31, (1956), (copy in Scientific Library).

Astia, Report AD 266452, pp. 6 and 19–20, Nov. 22, 1961.

SAMUEL H. BLECH, *Primary Examiner.*

LOUIS P. QUAST, WILLIAM H. SHORT, *Examiners.*

J. T. BROWN, J. C. MARTIN, *Assistant Examiners.*